United States Patent [19]
Ge et al.

[11] Patent Number: 6,043,178
[45] Date of Patent: *Mar. 28, 2000

[54] MIDBARREL HYDROCRACKING CATALYST AND PREPARATION THEREOF

[76] Inventors: Zaigui Ge; Minghua Guan; Yongkang Hu; Lianhui Ding, all of Wanghua, Fushun, Liaoning, 113001, China

[ * ] Notice: This patent issued on a continued prosecution application filed under 37 CFR 1.53(d), and is subject to the twenty year patent term provisions of 35 U.S.C. 154(a)(2).

[21] Appl. No.: 08/554,886

[22] Filed: Nov. 9, 1995

[30] Foreign Application Priority Data

Nov. 9, 1994 [CN] China ................................ 94117758

[51] Int. Cl.⁷ ............................................. B01J 29/08
[52] U.S. Cl. ................. 502/64; 502/66; 502/79; 502/85; 502/86
[58] Field of Search .................. 502/64, 66, 79, 502/85, 86

[56] References Cited

U.S. PATENT DOCUMENTS

| | | | |
|---|---|---|---|
| 4,010,116 | 3/1977 | Secor et al. | 502/68 |
| 4,517,033 | 5/1985 | Okumura et al. | 148/432 |
| 4,735,928 | 4/1988 | Best et al. | 502/65 |
| 4,762,813 | 8/1988 | Ward | 502/66 |
| 5,358,917 | 10/1994 | Van Veen et al. | 502/66 |

*Primary Examiner*—Tom Dunn
*Attorney, Agent, or Firm*—Knobbe, Martens, Olson & Bear, LLP

[57] ABSTRACT

A midbarrel hydrocracking catalyst includes the following:

a. 10–75% by weight of a Y-type molecular sieve;

b. 10–25% by weight of a small pore alumina;

c. 0–40% by weight of an amorphous aluminosilicate;

d. 0–25 % by weight of a large pore alumina;

e. 12–32% by weight of a Group VIB metal oxide, and f. 3–8% by weight of a Group VIII metal oxide.

The Y-type molecular sieve is a high silica Y-type molecular sieve USSSY of a $Na_2O$ content of no more than 0.2% by weight, a $SiO_2$ to $Al_2O_3$ molar ratio of 6–40, a relative crystallinity of more than 80% and a unit cell size of 2.426–2.44 nm.

16 Claims, No Drawings

MIDBARREL HYDROCRACKING CATALYST AND PREPARATION THEREOF

FIELD OF THE INVENTION

The present invention relates to a midbarrel hydrocracking catalyst, more particularly, to a hydrocracking catalyst of improved activity, selectivity and stability for producing middle distillates from vacuum gas oil and the like, especially of improved resistance to nitrogenous matter present in the feed material.

BACKGROUND OF THE INVENTION

Petroleum refiners usually employ hydrocracking process to produce desirable products such as turbine fuel, diesel fuel and other middle distillate products in the presence of a suitable hydrocracking catalyst. In recent years, since the vacuum gas oil becomes heavier in density and worse in quality, the hydrocracking catalysts are required to possess high activity, selectivity and stability for producing middle distillates from vacuum gas oil and the like, and especially to possess high resistance to various catalytic poison, in particular nitrogenous matter present in the feed material. Unfortunately, the prior art hydrocracking catalysts are suitable for processing a feed material with a nitrogenous matter level of no more than $10 \times 10^{-4}\%$ by weight (calculated as nitrogen), and when the nitrogen level of the feed material increases, the hydrocracking catalyst deactivates rapidly, in order to keep the productivity of the hydrocracking process constant, the operation temperature should be increased, which incurs more operation expense.

Each of U.S. Pat. Nos. 4,517,033, 4,517,074, 4,563,434, 4,576,711, 4,664,776, 4,672,048 and 4,762,813 disclosed a midbarrel hydrocracking catalyst, which comprises a molecular sieve, an amorphous aluminosilicate, an alumina and hydrogenation metal components, wherein said molecular sieve is LZ-10, LZ-210, modified LZ-210 or USY. Of the molecular sieves, LZ-10 is obtained by further hydrothermally treating USY, and LZ-210 is prepared by treating $NH_4NaY$ molecular sieve with ammonium fluorosilicate in the presence of a buffer solution. However, when LZ-10 is used to prepare a midbarrel hydrocracking catalyst, the result catalyst achieves good selectivity to middle distillates but relatively low activity; while when LZ-210, modified LZ-210 or USY is used, the resulting catalyst possesses high activity but low selectivity to middle distillates.

It is known that the resistance of the hydrocracking catalyst containing a molecular sieve to nitrogenous matter can be improved by strengthening the resistance of said molecular sieve to nitrogenous matter. A known effective technique to strengthen the resistance of a molecular sieve to nitrogenous matter is treating $NH_4NaY$ molecular sieve with fluorosilicate salts or fluorosilic acid in the presence of a buffer solution, but such a treating process provides molecular sieve with relatively low activity and resistance to nitrogenous matter.

SUMMARY OF THE INVENTION

Accordingly, an object of the invention is to provide a hydrocracking catalyst of improved activity, selectivity and stability for producing middle distillates from vacuum gas oil and the like, especially of improved resistance to nitrogenous matter, the catalyst of the present invention comprises:

10–75% by weight of a Y-type molecular sieve;
 10–25% by weight of a small pore alumina;
 0–40% by weight of an amorphous aluminosilicate;
 0–35% by weight of a large pore alumina;
 12–32% by weight of a Group VIB metal oxide; and
 3–8% by weight of a Group VIII metal oxide;

wherein the Y-type molecular sieve is a high silica Y-type molecular sieve of a $Na_2O$ content of no more than 0.2% by weight, a $SiO_2$ to $Al_2O_3$ molar ratio of 6–40, a relative crystallinity of more than 80% and a unit cell size of 2.426–2.444 nm, designated as USSSY.

Another object of the present invention is to provide a process for preparing a high silica Y-type molecular sieve USSSY of a $Na_2O$ content of no more than 0.2% by weight, a $SiO_2$ to $Al_2O_3$ molar ratio of 6–40, a relative crystallinity of more than 80% and a unit cell size of 2.426–2.444 nm, said process comprises treating a low sodium and high silica Y molecular sieve of a $Na_2O$ content of no more than 0.2% by weight, a $SiO_2$ to $Al_2O_3$ molar ratio of 6–40, a relative crystallinity of more than 95% and a unit cell size of 2.444–2.455 nm at 500–700° C. under a steam pressure of 0.05–0.2 MPa for 0.5–2 hours.

A still another object of the present invention is to provide a preparation process for a hydrocracking catalyst of improved activity, selectivity and stability for producing middle distillates from vacuum gas oil and the like, the process of the present invention comprises:

adding dilute nitric acid to a small pore alumina and comulling to form an adhesive; and
 mixing a USSSY, an adhesive, a Group VIB element salt or oxide and/or a Group VIII element salt or oxide, and optionally a large pore alumina and an amorphous aluminosilicate, and kneading, then drying at 100° C.–150° C. for 3–6 hours, finally calcining at 450–650° C. for 3–6 hours to give a catalyst; or
 mixing a USSSY, an adhesive, and optionally a large pore alumina and an amorphous aluminosilicate, kneading, drying at 100–150° C. for 3–5 hours, calcining at 450–650° C. for 3–5 hours to give a support, impregnating said support with an aqueous solution containing a Group VIB element and/or a Group VIII element, then drying at 100–150° C. for 3–6 hours and finally calcining at 450–650° C. for 3–6 hours to give a catalyst.

DETAILED DESCRIPTION OF THE PREFERRED EMBODIMENT

The inventors carried out extensive investigation on catalyst systems applied in the hydrocracking process and found that a high silica Y-type molecular sieve of a $Na_2O$ content of no more than 0.2% by weight, a $SiO_2$ to $Al_2O_3$ molar ratio of 6–40, a relative crystallinity of more than 80% and a unit cell size of 2.426–2.444 nm possesses improved activity, selectivity and superior resistance to nitrogenous matter under hydrocracking process conditions, and that when such a molecular sieve is used to prepare a hydrocracking catalyst, the resulting catalyst achieves unexpectedly improved activity and selectivity for producing middle distillates from vacuum gas oil and the like, in addition to improved resistance to nitrogenous matter present in the feed material.

The hydrocracking catalyst of the present invention comprises a Y-type molecular sieve, a small pore alumina, a Group VIB element oxide and/or a Group VIII element oxide, and optionally an amorphous aluminosilicate and a large pore alumina.

The Y-type molecular sieve used in the present invention is a high silica Y-type molecular sieve of a $Na_2O$ content of no more than 0.2% by weight, a $SiO_2$ to $Al_2O_3$ molar ratio of 6–40, a relative crystallinity of more than 80% and a unit cell size of 2.426–2.444 nm, and is designated as a molecular sieve USSSY. Such a USSSY is included in the present catalyst at a level of 10–75% by weight.

The USSSY can be preferably prepared from a Y molecular sieve of a $Na_2O$ content of no more than 0.2% by weight, a $SiO_2$ to $Al_2O_3$ molar ratio of 6–40, a relative crystallinity of more than 95% and a unit cell size of 2.444–2.455 nm, by hydrothermally treating said Y molecular sieve at 500–700° C. under a steam pressure of 0.05–0.2 MPa for 0.5–2 hours. Said Y molecular sieve is one preferably prepared by treating a NaY and/or $NH_4NaY$ in the absence of any pH regulating agent, detailed as in, for example, Chinese Patent Application No. CN90102645.X The process for preparing the low-sodium-high-silica Y-type molecular sieve is identical with that disclosed in CN90102645.X, and comprises the steps of:

(1) mixing the raw material Y type molecular sieve ($NH_4NaY$ or NaY) with water to give a slurry having a concentration of 5–30 g of the raw material Y type molecular sieve per 100 ml of the slurry and heating the slurry to a reaction temperature of 50–120° C.;

(2) allowing to react by adding generally at an adequately slow rate of 30 g max., preferably 5–25 g, of crystalline ammonium hexafluorosilicate or equivalent aqueous solution thereof per 100 g Y type molecular sieve/hour.

(3) continuously stirring the mixture within 0.1–24 hours after completion of the addition of ammonium hexafluorosilicate while maintaining the reaction temperature at 50–120° C.;

(4) separating the product from the reaction mixture;

(5) washing with water, filtering and drying the isolated low-sodium-high-silica Y type molecular sieve and sodium ammonium fluoroaluminate crystal to give the end product.

The small pore alumina used in the present invention, commercially available from, for example, No. 3 Refinery of Fushun, P.R. China, is of a pseudoboehmite phase. Its pore volume is 0.40–0.60ml/g, surface area 180–340 m²/g, alumina trihydrate content less than 3% by weight. Said small pore alumina is present in the present catalyst at a level of 10–25% by weight.

The amorphous aluminosilicate used herein is present in the catalyst at a level of 0–40% by weight. Its $SiO_2$ content is 10–90% by weight, pore volume 0–56–1.08 ml/g, surface area 220–460 m²/g. It can be prepared by conventional process, such as depositing $SiO_2$ upon porous $Al_2O_3$ to give an amorphous aluminosilicate cogel or graft copolymer, or by depositing $Al_2O_3$ upon porous $SiO_2$ to give said cogel or graft copolymer according to U.S. Pat. No. 4,517,073. Such an amorphous aluminosilicate is also available from for example No. 3 refinery of Fushun, P.R. China. When there is no amorphous aluminosilicate present in the present catalyst, the catalyst will become more suitable for producing light oils, but still possess high resistance to nitrogenous matter.

The large pore alumina used in the invention, commercially available from for example No. 3 Refmery of Fushun, P.R. China, possesses a pore volume of 0.8–1.1 ml/g, a surface area of 230–400m²/g, an alumina trihydrate content of less than 2% by weight. Its content in the present catalyst is 0–35% by weight.

The hydrogenation metals used in the present invention are a Group VIB element and/or a Group VIII element of the periodic table of elements, their contents in oxide form in the catalyst are 12–32% by weight and 3–8% by weight respectively. The Group VIB elements are preferably W and/or Mo, and the Group VIII elements are preferably Ni and/or Co, the metals can be used in combination or singly.

To produce the present catalyst, one can first prepare an adhesive by comulling a mixture of a small pore alumina and a nitric acid solution, then mechanically mix the hydrogenation metal oxides and/or insoluble salts thereof, a molecular sieve, an adhesive, and optionally a large pore alumina and an amorphous aluminosilicate, or alternatively, impregnate a support prepared from a mixture of a molecular sieve, an adhesive, and optionally an amorphous aluminosilicate and a large pore alumina with a solution of soluble salts of said hydrogenation elements, and knead, then dry at 100–150° C. for 3–6 hours and finally calcining at 450–650° C. for 3–6 hours to give the catalyst. Said support can be prepared by kneading said mixture, then drying at 100–150° C. for 3–5 hours, and finally calcining at 450–650° C. for 3–5 hours. Said metal oxide can be, for example, $MoO_3$, $WO_3$, NiO, CoO and $Co_2O_3$ etc., said insoluble salts can be, for example, $NiCO_3$, $CoCO_3$ etc. Said soluble salts can be, for example, $Ni(NO_3)_2$, $Co(NO_3)_2$, $(NH_4)_2MoO_4$ and $(NH_4)_2W_4O_{13}$. Soluble acid of th corresponding element can also be used.

The present catalyst can be moulded into any form suitable for hydrocracking process before putting into use. The operation temperature for the catalyst is preferably 300–400° C., the hydrogen partial pressure is preferably 5–20 MPa.

By utilizing a USSSY, the molecular sieve of improved activity, selectivity and improved resistance to nitrogenous matter, the present catalyst can achieve improved activity, selectivity and stability for producing middle distillates from vacuum gas oil and the like, even at a nitrogenous matter level of up to $30 \times 10^{-4}$% by weight (calculated as nitrogen, and the same below) of a feed material.

The present invention will be described in more detail by way of the nonlimiting examples below.

EXAMPLE 1

A low sodium and high silica Y molecular sieve is prepared according to CN 90102645.X. The said Y molecular sieve is treated at 600° C. under a steam pressure of 0.1 MPa for 1 hour to give USSSY-1.

EXAMPLE 2

The Y molecular sieve prepared as in Example 1 is treated at 500° C. under a steam pressure of 0.05 MPa for 1 hour to give USSSY-2.

EXAMPLE 3

The Y molecular sieve prepared as in Example 1 is treated at 550° C. under a steam pressure of 0.2 MPa for 1 hour to give USSSY-3.

The properties of USSSYs prepared in Example 1 to Example 3 are shown in Table 1.

TABLE 1

| Properties of USSSYs | | | |
|---|---|---|---|
| | USSSY-1 | USSSY-2 | USSSY-3 |
| molar ratio of $SiO_2$ to $Al_2O_3$ | 10.01 | 10.05 | 9.99 |
| unit cell size, nm | 2.440 | 2.438 | 2.439 |

TABLE 1-continued

Properties of USSSYs

|  | USSSY-1 | USSSY-2 | USSSY-3 |
|---|---|---|---|
| relative crystallinity, % | 99 | 110 | 103 |
| $Na_2O$ content, % by weight | 0.05 | 0.2 | 0.05 |

EXAMPLE 4

440 ml of 0.2N $HNO_3$ solution is added to 75.4 g of a small pore alumina $Al_2O_3$ of a pore volume of 0.47 ml/g and a surface area of 280 $m^2/g$ (available from No. 3 Refinery of Fushun, P.R. China). This mixture is mulled to give an is adhesive (the same in all examples.) 180.5 g of USSSY-1, 100.8 g of $H_2WO_4$, 82.8 g of $Ni(NO_3)_2\cdot6H_2O$ and the prepared adhesive are subjected to comulling in a grinder into a paste which is then extruded. The extrudate is allowed to dry, then further dried at 110° C. for 3 hours, and finally calcined in the stream of air at 500° C. for 5 hours to give Catalyst A.

EXAMPLE 5

80.8 g of USSSY-2, 40.7 g of an amorphous aluminasilicate of a pore volume of 0.64 $m^1/g$ and a surface area of 310 $m^2/g$, 40.7 g of large pore $Al_2O_3$ of a surface area of 350 $m^2/g$ and a pore volume of 0.90 ml/g (available from No. 3 Refinery of Fushun) and 105.5 g of adhesive prepared as in Example 4 are subjected to comulling in a grinder into a paste which is then extruded. After being dried, the extrudate are calcined at 600° C. for 5 hours to give a carrier. The carrier obtained is impregnated with a mixture of an aqueous solution of ammonium metatungstate and nickelous nitrate, dried at 110° C. for 3 hours and finally calcined at 500° C. for 4.5 hours to give Catalyst B.

EXAMPLE 6

A mixture of 40.9 g of USSSY-3, 88.2 g of large pore $Al_2O_3$ of a pore volume of 0.90 ml/g and a surface area of 350 $m^2/g$, 105.0 g of $H_2WO_4$, 88.2 g of $Ni(NO_3)_2\cdot6H_2O$ and 220.5 adhesive prepared as in Example 4 is extruded, dried at 110° C. for 5 hours and finally calcined at 500° C. for 6 hours to give Catalyst C.

EXAMPLE 7

A mixture of 80 g of USSSY-3, 19.2 g of a large pore $Al_2O_3$, 48g of an amorphous aluminosilicate and 40g of adhesive prepared as in Example 4 is extruded, dried at 110° C. for 5 hours and calcined at 650° C. for 3 hours. The carrier thus obtained is impregnated with a mixture solution of ammonium metatungstate and nickelous nitrate which contains 54.07 g of $WO_3$/100 ml and 9.38 g of NiO/100 ml respectively, dried at 110° C. for 6 hours and calcined at 500° C. for 6 hours to give Catalyst D.

EXAMPLE 8

Catalyst E is prepared in the same procedures as in Example 7 except that the large pore $Al_2O_3$ is not used.

Compositions of catalysts of Example 4 to Example 8 are as follows:

татEASE TABLE 2

Catalyst Compositions

| Catalyst | A | B | C | D | E |
|---|---|---|---|---|---|
| composition, % by weight USSSY | 48.8 | 28.6 | 13.0 | 40 | 40 |
| small pore $Al_2O_3$ | 20.4 | 14.4 | 21.0 | 20 | 20 |
| large pore $Al_2O_3$ | — | 11.2 | 28.0 | 16 | — |
| amorphous aluminosilicate | — | 16.8 | — | 24 | 40 |
| $WO_3$ | 25.1 | 24.1 | 31.0 | 24.06 | 20.91 |
| NiO | 5.6 | 4.9 | 7.0 | 3.62 | 7.23 |

COMPARATIVE EXAMPLE 1

A mixture of 15 g of $MoO_3$, 20 g of $Ni(NO_3)_2\cdot6H_2O$, 59.9 g of a USY molecular sieve available from No. 3 Refinery of Fushun, P.R. China and 66.7 g of an adhesive prepared as in Example 4 is comulled in a grinder into a paste, which is then extruded, dried at 105° C. for 3 hours and calcined at 500° C. for 4 hours to give comparative Catalyst A'.

COMPARATIVE EXAMPLE 2

Comparative Catalyst B' is prepared according to the procedures as described in U.S. Pat. No. 3,897,327.

COMPARATIVE EXAMPLE 3

Comparative Catalyst C' is prepared according to the procedures as described in U.S. Pat. No. 4,664,776.
Compositions of comparative catalysts are as follows:

TABLE 3

Compositions of Comparative Catalysts

| Catalyst | A' | B' | C' |
|---|---|---|---|
| composition, % by weight USSSY | 60 | 16 | 40 |
| small pore $Al_2O_3$ | 20 | 20 | 20 |
| large pore $Al_2O_3$ | — | 36 | 16 |
| amorphous aluminosilicate | — | 28 | 24 |
| $WO_3$ | 15($MoO_3$) | 20.87 | 23.0 |
| NiO | 5 | 6.0 | 3.5 |

EXAMPLE 9
Evaluation of Catalytic Activity

Catalysts are evaluated by a single-stage once-through operation in a 200 ml small scale reactor. Vacuum gas oil is pre-treated by hydrorefining to remove hetero-atoms, hydrogenate aromatics, and to keep nitrogen and sulphur at certain levels. The sulphur level is finally controlled at about 0.3% by weight (if necessary, $CS_2$ can be injected) before contacting the catalyst. The properties of the pre-treated vacuum gas oil to be used as feed material are as follows:

TABLE 4

Properties of the Vacuum Gas Oil

| Pre-treated Vacuum Gas Oil NO. | 1 | 2 | 3 |
|---|---|---|---|
| density ($D_4^{20}$), $g/cm^3$ | 0.9176 | 0.8732 | 0.8792 |
| distillation range, ° C. | | | |
| initial point | 262 | 272 | 280 |
| 50% | 427 | 425 | 391 |
| 95% | 512 | 502 | 457 |

TABLE 4-continued

Properties of the Vacuum Gas Oil

| Pre-treated Vacuum Gas Oil NO. | 1 | 2 | 3 |
|---|---|---|---|
| dry point | 520 | — | 470 |
| sulfur, $10^{-4}$ w % | 34 | 41 | 34 |

(1) Comparison between A and A'

Activities of Catalyst A and A' are evaluated for comparison, using pre-treated vacuum gas oil 1 as feed material. Process conditions and results are as follows:

TABLE 5

| Catalyst | A | A' |
|---|---|---|
| reaction conditions | | |
| H2 partial pressute, MPa | 7.8 | 7.8 |
| hydrocracking temperature, ° C. | 375 | 375 |
| volume space velocity, $h^{-1}$ | 1.81 | 1.34 |
| $H_2$/oil ratio, v/v | 1500:1 | 1500:1 |
| nitrogen level of feed material, $10^{-4}$ % by weight | 25.8 | 3.8 |
| product distribution, % by weight | | |
| C1–C4 | — | 5.9 |
| C5-65° C. | 3.2 | 4.5 |
| 65–177° C. | 32.3 | 27.8 |
| 177–340° C. | 35.8 | 33.4 |
| >340° C. | 26.8 | 30.2 |
| <340° C. | 71.3 | 65.7 |
| product properties | | |
| 65–177° C. naphtha | | |
| density($D_4^{20}$), g/cm³ | 0.7570 | 0.7579 |
| aromatic potential content, % by weight | 65 | 52 |
| 177–340° C. diesel oil | | |
| density($D_4^{20}$), g/cm³ | 0.8249 | 0.8254 |
| hexadecane value | 47.1 | 47.1 |
| solidification point, ° C. | <26 | <–30 |

As shown in Table 5, Catalyst A of the invention possesses higher activity and resistance to nitrogen. Furthermore, less gas and a naphtha of higher aromatic potential are produced in the presence of Catalyst A of the invention.

(2) Activity Evaluation for Catalyst A, B and C

Catalysts A, B and C. are evaluated using pre-treated vacuum gas oil 2 as the feed material under the same operation conditions: hydrogen partial pressure, 14.7 MPa; $H_2$/oil ratio, 1500:1 (v/v); volume space velocity, $1.5h^{-1}$; nitrogen level, $18 \times 10^{-4}$% by weight. Results are as follows:

TABLE 6

Evaluation of Catalysts A, B and C

| Catalyst | A | B | C |
|---|---|---|---|
| reaction temp., ° C. | 374 | 370 | 355 |
| product distribution, % by weight | | | |
| <65° C. | 3.7 | 5.6 | 1.8 |
| 65–180° C. | 50.8 | 46.2 | 26.6 |
| 180–320° C. | 29.78 | 32.7 | 31.4 |
| yield | 93.6 | 94.7 | 99.8 |

As shown in Table 6, under various operation temperature, the catalysts of the invention achieve high activities and produce acceptable products.

(3) Test on Selectivities of Catalysts D, E, B' and C' to Middle Distillates.

Operation conditions and results for this test are shown in Table 7 and 8, respectively.

TABLE 7

Operation Conditions

| Feed Material | Pre-treated Vacuum gas oil 3, $18 \times 10^{-4}$% by weight of N |
|---|---|
| conversion of fractions with b.P. less than 350° C., % by weight | 60 |
| $H_2$ partial pressure, MPa | 14.7 |
| volume space velocity, $h^{-1}$ | 1.5 |
| $H_2$/oil ratio, v/v | 1500:1 |

TABLE 8

Evaluation Results

| Catalyst | Reaction Temp, ° C. | Selectivity to middle distillates* |
|---|---|---|
| D | 358 | 76.2 |
| E | 360 | 75.8 |
| B' | 371 | 76.4 |
| C' | 358 | 74.7 |

*selectivity to middle distillates = (weight of 132–350° C. fractions)/(weight of 60–350° C. fractions)

As shown in Table 8, when selectivity of the catalyst of the invention to middle distillates is equal to that of Catalyst B', the reaction temperature with the catalyst of the invention can be decreased by 13–15° C. At the same reaction temperature, selectivity of Catalyst E is increased by 1.1% by weight compared with Catalyst C'.

EXAMPLE 10

Catalyst A is evaluated under different pressures. Pre-treated vacuum gas oil 2 is used and the results are shown in Table 9.

TABLE 9

Evaluation of Catalyst A Under Various Pressures

| $H_2$ partial pressure, MPa | 9.8 | 7.84 | 6.37 |
|---|---|---|---|
| reaction temp, ° C. | 365 | 365 | 368 |
| N content in feed material $10-4$% by weight | 8.5 | 13.5 | 17.1 |
| density of the product oil ($D_4^{20}$), g/cm³ | 0.7655 | 0.7844 | 0.7909 |
| product distribution, % by weight | | | |
| <65° C. | 4.6 | 3.5 | 3.1 |
| 65–180° C. | 36.0 | 27.9 | 25.1 |
| 180–350° C. | 32.4 | 32.8 | 33.8 |
| >350° C. | 24.8 | 30.7 | 36.4 |
| properties of the product | | | |
| 6514 180° C. naphtha PNA | 52.2/43.1/4.7 | 46.7/45.6/7.7 | 47.0/43.5/9.5 |
| aromatic potential content, % by weight | 45.3 | 50.9 | 50.7 |
| 180–350° C. diesel oil | | | |
| Solidification point, _° C. | — | –16 | –12 |
| diesel index | — | 70.8 | 64.7 |
| BMCI value of >350° C. tail oil | 9.1 | 10.7 | 8.5 |

As shown in Table 9, desirable products can be produced under middle pressure even when nitrogen content in feed material is relatively high.

EXAMPLE 11
Stability Tests of the Catalysts (1) Stability Test of Catalyst A

Stability of Catalyst A is tested for 2100 hours under 7.8 MPa using pre-treated vacuum gas oil 1 with a nitrogen content in the range of $20-30\times10^{-4}\%$ by weight. When 60% conversion of fractions with a b.P. less than 320° C. is kept constant, the reaction temperature is only increased by 3° C. and the increase rate of temperature is 0.034° C./day, which indicates that catalyst of the invention has relatively high activity and stability even when nitrogen content is high.

(2) Stability Test of Catalyst D

Stability of Catalyst D prepared in Example 8 is tested for 5212 hours under the same operation conditions as those in (3) of Example 9. The reaction temperature is only increased by 5° C. during the whole operation, which means that the catalyst of the invention possesses good stability.

What is claimed is:

1. A process for preparing a USSSY, comprising:

preparing a Y molecular sieve having a $Na_2O$ content of no more than 0.2% by weight by treating a NaY or $NH_4NaY$ molecular sieve with ammonium fluorosilicate in the absence of any pH regulating agent and any ion-exchanging substance; and forming a USSSY by hydrothermally treating the Y molecular sieve, the USSSY being a high silica Y-type molecular sieve having a $SiO_2$ to $Al_2O_3$ molar ratio of 6–40, a relative crystallinity of more than 80% and a unit cell size of 2.426–2.444 nm.

2. A process according to claim 1, wherein said Y molecular sieve has a $Na_2O$ content of no more than 0.2% by weight, a $SiO_2$ to $Al_2O_3$ molar ratio of 6–40, a relative crystallinity of more than 95% and a unit cell size of 2.444–2.455 nm, and said USSSY is prepared by treating said Y molecular sieve at 500–700° C. under a steam pressure of 0.05–0.2 MPa for 0.5–2 hours.

3. A process according to claim 2, wherein said ammonium fluorosilicate comprises crystalline ammonium fluorosilicate.

4. A method for preparing a catalyst, comprising:

(a) preparing a USSSY by the process as defined in claim 1, (b) adding dilute nitric acid to a first pseudoboehmite alumina having a pore volume ranging from 0.40 to 0.60 ml/g and comulling to form an adhesive;

(c) mixing the USSSY, the adhesive, a second pseudoboehmite alumina having a pore volume ranging from 0.8 to 1.1 ml/g and an amorphous aluminosilicate;

(d) kneading (e) drying at 100–150 C for 3–6 hours (f) calcining at 450–650 C for 3–6 hours to give a catalyst wherein a Group VIB element and/or a Group VIII element is introduced prior to the drying step (e).

5. A method as defined in claim 4, wherein the Group VIB element and/or the Group VIII element is introduced in a form of salt or oxide of the element during the mixing step (c).

6. A method as defined in claim 4, wherein the Group VIB element and/or the Group VIII element is introduced as an aqueous solution, the method additionally comprising between the kneading step (d) and the drying step (e) the following steps:

(d1) drying at 100–150 C for 3–5 hours;

(d2) calcining at 450–650 C for 3–5 hours to give a support; and (d3) impregnating said support with the aqueous solution.

7. A midbarrel hydrocracking catalyst, comprising:

10–75% by weight of a Y-type molecular sieve

10–25% by weight of a first pseudoboehmite alumina having a pore volume ranging from 0.40 to 0.60 ml/g;

0–40% by weight of an amorphous aluminosilicate;

0–35% by weight of a second pseudoboehmite alumina having a pore volume ranging from 0.8 to 1.1 ml/g;

12–32% by weight of a Group VIB metal oxide; and

3–8% by weight of a Group VIII metal oxide;

wherein said Y-type molecular sieve is a high silica Y-type molecular sieve USSSY having a $Na_2O$ content of no more than 0.2% by weight, a $SiO_2$ to $Al_2O_3$ molar ratio of 6–40, a relative crystallinity of more than 80% and a unit cell size of 2.426–2.444 nm, said USSSY is prepared by the process according to claim 1.

8. A midbarrel hydrocracking catalyst according to claim 7, wherein said Y molecular sieve has a $Na_2O$ content of no more than 0.2% by weight, a $SiO_2$ to $Al_2O_3$ molar ratio of 6–40, a relative crystallinity of more than 95% and a unit cell size of 2.444–2.455 nm, and said USSSY is prepared by treating said Y molecular sieve at 500–700° C. under a steam pressure of 0.05–0.2 MPa for 0.5–2 hours.

9. A midbarrel hydrocracking catalyst according to claim 7, wherein said ammonium fluorosilicate comprises crystalline ammonium hexafluorosilicate.

10. A midbarrel hydrocracking catalyst according to claim 7 wherein said first pseudoboehmite alumina has a surface area of 180–340 $m^2/g$ and an alumina trihydrate content of less than 3% by weight.

11. A midbarrel hydrocracking catalyst according to claim 7, wherein said amorphous aluminosilicate is an amorphous aluminosilicate having a pore volume of 0.56–1.08 ml/g, a surface area of 200–460 $m^2/g$ and a $SiO_2$ content of 10–90% by weight.

12. A midbarrel hydrocracking catalyst according to claim 7, wherein said second pseudoboehmite alumina has a surface area of 230–400 $m^2/g$ and an alumina trihydrate content of less than 2% by weight.

13. A midbarrel hydrocracking catalyst according to claim 7, wherein said Group VIII element is Ni, Co or a mixture thereof.

14. A midbarrel hydrocracking catalyst according to claim 7, wherein said Group VIB element is Mo, W or a mixture thereof.

15. A midbarrel hydrocracking catalyst according to claim 7, wherein said Y molecular sieves prepared by treating said NaY and/or $NH_4NaY$ molecular sieve with a method comprising the steps of:

mixing the $NH_4NaY$ or NaY molecular sieve with water to give a slurry having a concentration of 5–30 g of the $NH_4NaY$ or NaY molecular sieve per 100 ml of the slurry and heating the slurry to a reaction temperature of 50–120° C.;

adding to the slurry at a rate of 5–30g of said ammonium fluorosilicate per 100 g of the $NH_4NaY$ or NaY molecular sieve/hour forming a mixture;

continuously stirring the mixture within 0.1–24 hours after completion of the addition of the ammonium fluorosilicate while maintaining reaction temperature at 50–120° C. to form said Y molecular sieve and solid sodium ammonium fluoroaluminate;

separating said Y molecular sieve from said solid sodium ammonium fluoroaluminate and the reaction mixture.

16. A midbarrel hydrocracking catalyst, comprising:
10–75% by weight of a Y-type molecular sieve
10–25% by weight of a pseudoboehmite alumina having a pore capacity ranging from 0.40 to 0.60 ml/g;
12–32% by weight of a Group VIB metal oxide; and
3–8% by weight of a Group VIII metal oxide;
 wherein said Y-type molecular sieve is a high silica Y-type molecular sieve USSSY having a $Na_2O$ content of no more than 0.2% by weight, a $SiO_2$ to $Al_2O_3$ molar ratio greater than or equal to 9.99 and less than 40, a relative crystallinity of more than 80% and a unit cell size of 2.426–2.444 nm, said USSSY is prepared by the process according to claim 1.

\* \* \* \* \*

UNITED STATES PATENT AND TRADEMARK OFFICE
CERTIFICATE OF CORRECTION

PATENT NO. : 6,043,178
DATED : March 28, 2000
INVENTOR(S) : Ge et al.

It is certified that error appears in the above-identified patent and that said Letters Patent is hereby corrected as shown below:

Title page,
Replace item [73], as follows: [73] Assignee: China Petro-Chemical Corporation, Beijing, China and Fushun Research Institute of Petroleum and Petrochemicals Liaoning Province, China.

Signed and Sealed this

Twenty-third Day of April, 2002

Attest:

Attesting Officer

JAMES E. ROGAN
*Director of the United States Patent and Trademark Office*